United States Patent
Lesperance et al.

(10) Patent No.: US 10,242,694 B2
(45) Date of Patent: Mar. 26, 2019

(54) SYNCHRONIZATION OF DIGITAL ALGORITHMIC STATE DATA WITH AUDIO TRACE SIGNALS

(71) Applicant: Avaya Inc., Basking Ridge, NJ (US)

(72) Inventors: Allan Lesperance, Stirling (CA); Chris McArthur, Belleville (CA)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 15/163,871

(22) Filed: May 25, 2016

(65) Prior Publication Data

US 2017/0345445 A1 Nov. 30, 2017

(51) Int. Cl.
*G10L 21/055* (2013.01)
*G06F 3/16* (2006.01)

(52) U.S. Cl.
CPC ............ *G10L 21/055* (2013.01); *G06F 3/165* (2013.01)

(58) Field of Classification Search
CPC .................................. G06F 3/16; G10L 21/055
USPC .................. 379/67.1–88.28; 455/412.1–420; 704/270–278; 709/201–207, 217–248; 700/94
See application file for complete search history.

(56) References Cited

U.S. PATENT DOCUMENTS

| | | | | |
|---|---|---|---|---|
| 6,999,560 B1* | 2/2006 | Connor | ................ | H04M 3/002 379/3 |
| 8,300,776 B2* | 10/2012 | Davies | .................... | G10L 15/22 379/88.01 |
| 9,160,854 B1* | 10/2015 | Daddi | ................. | H04M 3/5175 |
| 2003/0046071 A1* | 3/2003 | Wyman | ................... | G10L 15/22 704/235 |
| 2003/0065655 A1* | 4/2003 | Syeda-Mahmood | ........ | G06F 17/30017 |
| 2008/0235021 A1* | 9/2008 | Cross | ...................... | G10L 21/06 704/257 |
| 2013/0144626 A1* | 6/2013 | Shau | ........................ | G10H 1/42 704/270 |
| 2016/0343272 A1* | 11/2016 | Roche | .................. | G06F 3/0481 |

* cited by examiner

*Primary Examiner* — Hemant S Patel

(57) ABSTRACT

Embodiments disclosed herein provide systems, methods, and computer readable media for synchronizing algorithmic state data with audio trace signals. In a particular embodiment, a method provides processing digital audio data linearly in the time domain using a digital audio processing algorithm. The method further provides determining the digital algorithmic state data comprising an output state of the digital audio processing algorithm at each of a plurality of time instances during the processing of the digital audio data. Also, the method provides aligning the digital algorithmic state data in the time domain with a trace of the digital audio data.

20 Claims, 6 Drawing Sheets

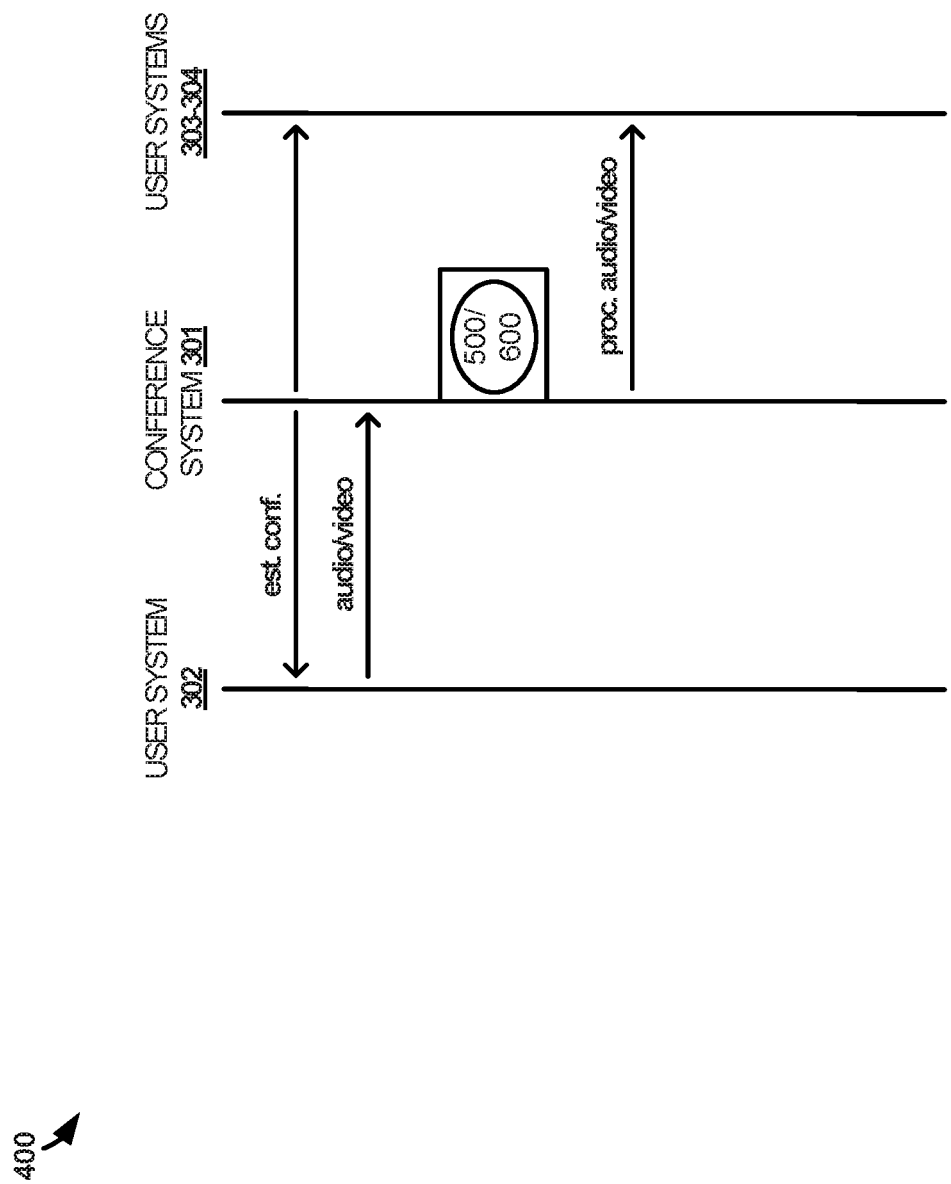

SYNCHRONIZATION OF DIGITAL ALGORITHMIC STATE DATA WITH AUDIO TRACE SIGNALS

TECHNICAL FIELD

Aspects of the disclosure are related to the use of algorithms in digital audio processing and, in particular, to presenting the state of such algorithms synchronized in time with the audio processed by the algorithms.

TECHNICAL BACKGROUND

Complex audio processing algorithms consist of various threshold detectors and state machines that need to be carefully understood, analyzed, and/or tuned for optimum performance. State machine and threshold data is usually made available by an algorithm in the form of digital readable status registers and/or individual data bits that can be monitored during processing. However, without the ability for a user to view that data in synchronization with the audio information that produced the data, the user may not be able to perform optimum analysis, tuning, and debugging of the algorithm.

OVERVIEW

Embodiments disclosed herein provide systems, methods, and computer readable media for synchronizing algorithmic state data with audio trace signals. In a particular embodiment, a method provides processing digital audio data linearly in the time domain using a digital audio processing algorithm. The method further provides determining the digital algorithmic state data comprising an output state of the digital audio processing algorithm at each of a plurality of time instances during the processing of the digital audio data. Also, the method provides aligning the digital algorithmic state data in the time domain with a trace of the digital audio data.

In some embodiments, the method provides displaying a graph of the algorithmic state data aligned in the time domain with the trace of the digital audio data.

In some embodiments, determining the digital algorithmic state data comprises using the digital audio processing algorithm to generate a first digital audio trace populated with the algorithm state outputs in the time domain based on corresponding time instances of the plurality of time instances.

In some embodiments, aligning the digital algorithmic state data in the time domain with the trace of the digital audio data comprises aligning the trace of the digital audio data with the first digital audio trace in the time domain.

In some embodiments, determining the digital algorithmic state data comprises polling the output of the digital audio processing algorithm at the plurality of time instances to identify the output states and storing the output states in association with respective ones of the plurality of time instances.

In some embodiments, aligning the digital algorithmic state data in the time domain with the trace of the digital audio data comprises generating a first digital audio trace populated with the output states at the respective ones of the plurality of time instances and aligning the trace of the digital audio data with the first digital audio trace in the time domain.

In some embodiments, aligning the trace of the digital audio data with the first digital audio trace in the time domain comprises receiving user input indicating proper alignment of the trace of the digital audio data with the first digital audio trace in the time domain.

In some embodiments, aligning the trace of the digital audio data with the first digital audio trace in the time domain comprises automatically synchronizing timing of the trace of the digital audio data with the timing of the first digital audio trace based on the plurality of time instances.

In some embodiments, the method further provides storing the digital algorithmic state data in a digital audio format.

In some embodiments, the digital audio format comprises pulse-code modulation.

In another embodiment, an audio processing system is provided that includes one or more computer readable storage media and a processing system operatively coupled with the one or more computer readable storage media. The audio processing system further includes program instructions stored on the one or more computer readable storage media that, when read and executed by the processing system, direct the processing system to process digital audio data linearly in the time domain using a digital audio processing algorithm. The program instructions further direct the processing system to determine the digital algorithmic state data comprising an output state of the digital audio processing algorithm at each of a plurality of time instances during the processing of the digital audio data. Also, the program instructions direct the processing system to align the digital algorithmic state data in the time domain with a trace of the digital audio data.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a scenario of operating in the other audio processing environment to synchronize algorithmic state data with audio trace signals.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
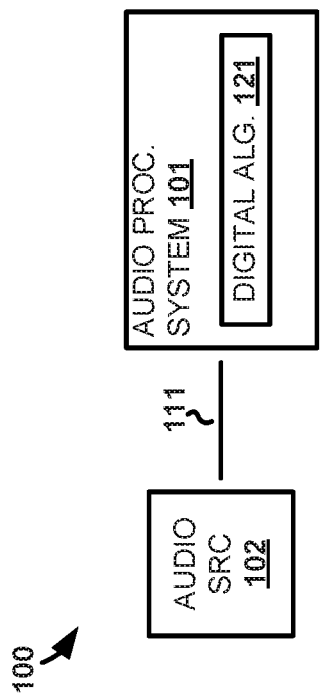
FIG. 1 illustrates an audio processing environment for synchronizing algorithmic state data with audio trace signals.

FIG. 1 illustrates audio processing environment 100 for synchronizing algorithmic state data with audio trace signals. Audio processing environment 100 includes audio processing system 101 and audio source 102. Audio processing system 101 and audio source 102 communicate over communication link 111. In some examples, audio source 102 may be built into or otherwise combined with audio processing system 101. Thus, communication link 111 may also be an internal (e.g. system bus) or peripheral (e.g. USB) communication link.

In operation, audio processing system 101 executes digital audio processing algorithm 121 to process audio obtained from audio source 102. Digital audio processing algorithm 121 may perform any type of processing function that modifies the processed audio itself and/or provides information about processed or unprocessed audio. Digital audio processing algorithm 121 may be an echo canceller, compressor, limiter, automatic gain control, noise suppressor, or some other type of algorithm for processing digital audio.

Digital audio processing algorithm 121 includes one or more built-in digital state identifiers, or condition triggers, such as level detectors, state-machines, activity triggers, timers, etc. State identifiers and condition triggers are used within the processing blocks to control or inform other inter-dependent algorithms and/or are used to provide externally readable processing and condition information during development or debug like activities for the algorithm. To assist in a user's ability to perform the aforementioned activities, audio processing system 101 aligns the state data (e.g. state identifiers and/or condition triggers) resulting from the processing of digital audio to be in time synchronization with the portions of the digital audio that caused the state data.

Figure 2:
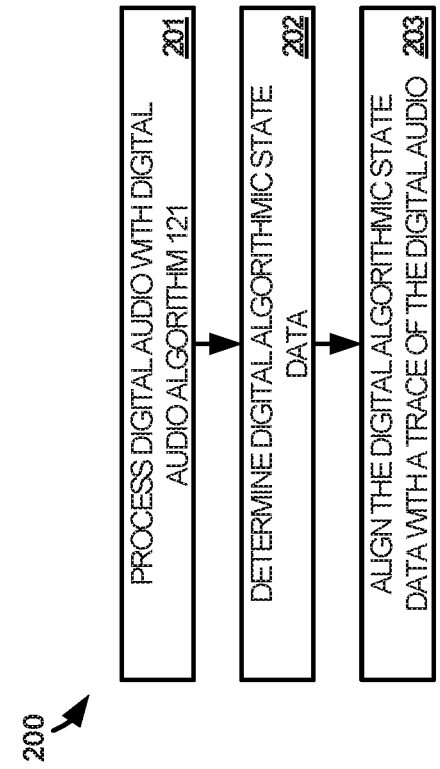
FIG. 2 illustrates a method of operating in the audio processing environment to synchronize algorithmic state data with audio trace signals.

FIG. 2 illustrates method 200 of operating in audio processing environment 100 to synchronize algorithmic state data with audio trace signals. Method 200 provides audio processing system 101 processing digital audio data linearly in the time domain using digital audio processing algorithm 121 (201). The digital audio data is obtained by audio processing system 101 from audio source 102. Audio source 102 may be a data storage system, an audio capture device (e.g. microphone), a networked telecommunication client, or any other device or system from which digital audio data may be obtained. The digital audio data may be obtained in a format suitable for digital audio processing algorithm 121 or audio processing system 101 may need to reformat the digital audio data (e.g. decode) before digital audio processing algorithm 121 can be applied to the digital audio data. Also, the digital audio data may be processed in real-time, as may be the case during real-time communications, or may be processed faster or slower than real-time.

Method 200 further provides audio processing system 101 determining the digital algorithmic state data comprising an output state of the digital audio processing algorithm at each of a plurality of time instances during the processing of the digital audio data (202). In some cases, digital audio processing algorithm 121 may itself be able to provide the digital algorithmic state data at instances during the processing of the digital audio data (e.g. periodically, whenever the state changes, or otherwise) while, in other cases, audio processing system 101 may poll digital audio processing algorithm 121 for the digital algorithmic state data. In the former example, digital audio processing algorithm 121 may be able to populate an audio trace directly with the digital algorithmic state data instead of audio information. The digital algorithmic state data may include information regarding the state of one digital state identifier/condition trigger or may include information regarding additional digital state identifiers/condition triggers if digital audio processing algorithm 121 is so equipped.

Method 200 then provides audio processing system 101 aligning the digital algorithmic state data in the time domain with a trace of the digital audio data (203). The alignment may be performed by generating an audio trace that is populated with the digital algorithmic state data at times along the trace corresponding to times in the digital audio data that caused each instance of the digital algorithmic state data. Since instances of the digital algorithmic state data may be spaced apart, the audio trace may fill in gaps between instances using best fit estimations, straight lines, or some other manner of connecting disparate data points. In some examples, as noted above, digital audio processing algorithm 121 is able to generate an audio trace populated with the digital algorithmic state data. By virtue of that audio trace being generated as the digital audio data is being processed, the trace of the digital algorithmic state data begins at the same time the digital audio data began being processed and will be aligned as long as the beginnings are in sync. In other examples, each instance of the digital algorithmic state data may be time stamped either individually or, if periodic, measured from an initial instance of the digital algorithmic state data.

Once aligned, the digital algorithmic state data may be presented to a user of audio processing system 101 or some other system that audio processing system 101 provides with the aligned digital algorithmic state data. The digital algorithmic state data may be presented in the form of a graph of a trace of the digital audio data in alignment with the digital algorithmic state data so that the user can easily visualize the correlation between the audio and a resulting state. In some cases, audio processing system 101 may store the digital algorithmic state data for viewing later. In those cases the digital algorithmic state data may be stored already in alignment with the digital audio data or step 203 may be performed after storing the unaligned digital algorithmic state data (e.g. upon accessing the digital algorithmic state data for presentation in time synchronization with the digital audio data).

In some cases, the aligned digital algorithmic state data may be presented as the audio is processed so that a user has a substantially real-time view of the digital algorithmic state data relative to the digital audio. Likewise, the displayed digital algorithmic state data may only be a portion of the generated digital algorithmic state data (e.g. 30 seconds of a 6-minute digital audio segment).

Referring back to FIG. 1, audio processing system 101 comprises a computer processor system for processing digital audio data. Audio processing system 101 may also include other components such as user interface components, data storage system, and power supply. Audio processing system 101 may reside in a single device or may be distributed across multiple devices. While shown separately, audio source 102 may be incorporated into audio processing system 101. Audio processing system 101 may be a telephone, computer, tablet, conference room system, e-book, mobile Internet appliance, network interface card, media player, game console audio communication server, video communication server, application server, conference bridge, personal computer workstation, network gateway system, or some other computing system—including combinations thereof.

Communication link 111 use metal, glass, air, space, or some other material as the transport media. Communication link 111 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication link 111 could be a direct link or may include intermediate networks, systems, or devices.

Figure 3:
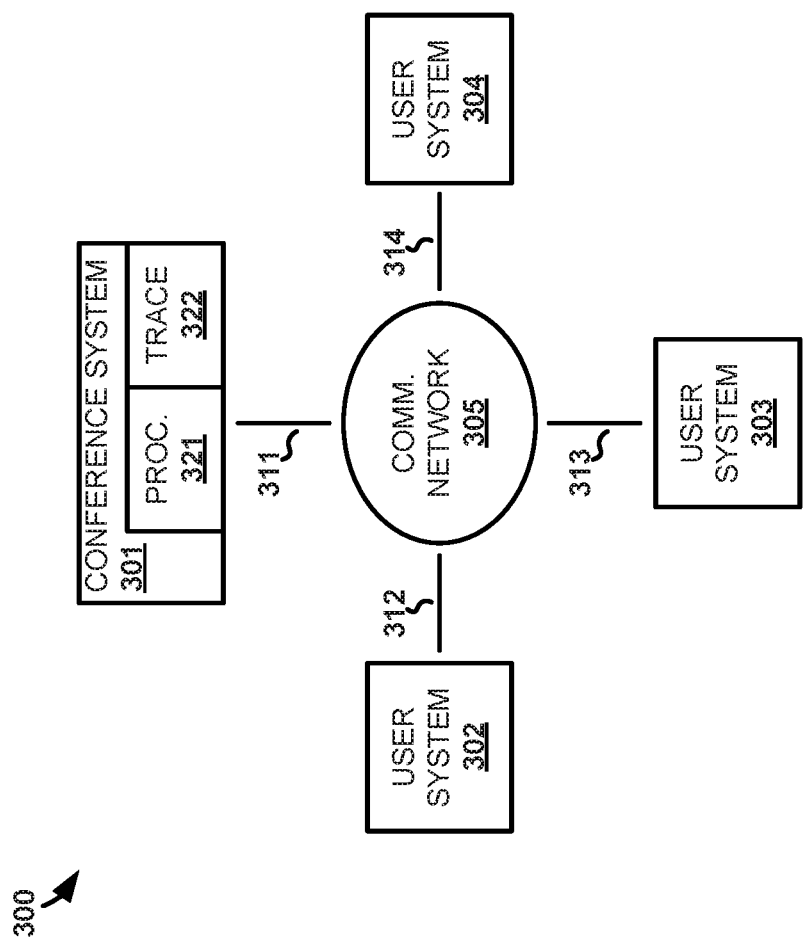
FIG. 3 illustrates another audio processing environment for synchronizing algorithmic state data with audio trace signals.

FIG. 3 illustrates audio processing environment 300 for synchronizing algorithmic state data with audio trace signals. Audio processing environment 300 includes conference system 301, user system 302, user system 303, user system 304, and communication network 305. Conference system 301 and user systems 302-304 communicate with communication network 305 over communication links 311-314, respectively.

Communication network 305 comprises network elements that provide communications services to elements 301-304. Communication network 305 may comprise switches, wireless access nodes, Internet routers, network gateways, application servers, computer systems, communication links, or some other type of communication equipment—including combinations thereof. Communication network 305 may be a single network, such as a local area network, a wide area network, or the Internet, or may be a combination of multiple networks.

In operation, conference system 301, at least in part, comprises an audio processing system that is configured to process audio received from user systems 302-304 during a real-time conference session. The conference session may be a voice or video conference or may also include other types of media, such as presentation slides, desktop sharing, etc. Thus, the audio processed may include voices captured of participants from each of user systems 302-304. While this example presents the audio processing system in the context of conference system 301, it should be understood that the methods described herein could be used in any audio processing context. For instance, even in this particular example, user systems 302-304 could themselves process at least a portion of the conference session audio.

FIG. 4 illustrates an operational scenario 400 of audio processing environment 300 to synchronize algorithmic state data with audio trace signals. Scenario 400 is described from the aspect of user system 302 transferring media and user systems 303-304 receiving that media. However, in order to facilitate a real-time conference session between participants at each user system, it should be understood that the same process may be occurring concurrently with respect to user systems 303-304.

In scenario 400, a conference session is established through conference system 301 between user systems 302-304. The conference may be a voice conference or may be a video conference that includes both audio and video of the participants. Conference system 301 may be instructed to establish the conference session by one of user systems 302-304 or the conference session may be initiated in some other manner. Once the conference session is established, user system 302 begins transferring digital audio (and video if session is a videoconference) captured of user system 302's one or more users to conference system 301 for use in the conference session. Conference system 301 then processes the audio received from user system 302 in accordance with one of scenarios 500 and 600 discussed below.

Figure 5:
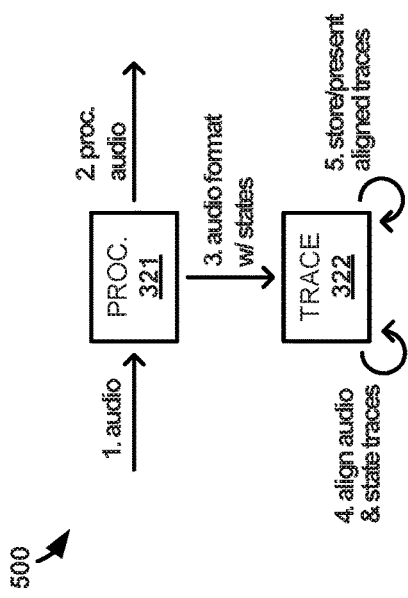
FIG. 5 illustrates another scenario of operating in the other audio processing environment to synchronize algorithmic state data with audio trace signals.

FIG. 5 illustrates scenario 500 to synchronize algorithmic state data with audio trace signals. In scenario 500, digital audio processing algorithm 321 comprises an algorithm that has the capability of performing multi-integrated audio trace recordings. Although, for the purposes of this example, the audio trace recording produced by digital audio processing algorithm 321 during the processing of the digital audio from user system 302 is populated with digital algorithmic state data rather than audio information. The trace recording may be generated into a standard audio file format, such as a pulse-code modulation (PCM) format. Since the digital algorithmic state data trace recording is stored in a standard format, the digital algorithmic state data trace recording can be visualized using the same programs that are used to typically display audio traces.

Specifically, in scenario 500, digital audio processing algorithm 321 is applied to the digital audio from user system 302 at step 1. If digital audio processing algorithm 321 produces an output of processed audio, that processed audio is output at step 2. If the purpose of digital audio processing algorithm 321 is to produce certain state or trigger information, then digital audio processing algorithm 321 may not produce an audio output. While processing the digital audio, at step 3, digital audio processing algorithm 321 also generates an audio trace populated with the digital algorithmic state data that is read synchronously during the processing of the digital audio.

At step 4, the generated audio trace is aligned by audio trace module 322 with a trace of the digital audio being processed. Step 4 may be trivial in scenario 500 since the digital algorithmic state data audio trace was generated in parallel with the audio processing by digital audio processing algorithm 321. As such, a time synchronized relationship will already exist. At step 5, audio trace module 322 can store the resulting trace of the digital algorithmic state data in conference system 301, or in some other storage system, for later retrieval and presentation to a user. Alternatively, the user may be presented with the trace immediately.

Regardless, with the digital state and trigger data now embedded into an audio compatible file format, it can be directly opened and viewed time synchronized with any parallel taken audio trace recordings, using a standard audio viewer/editor. The recorded digital algorithmic state data can also be further post-processed into extracted individual state data bits or to digitally alter the viewable audio level range, while maintaining its original sync alignment integrity.

Figure 6:
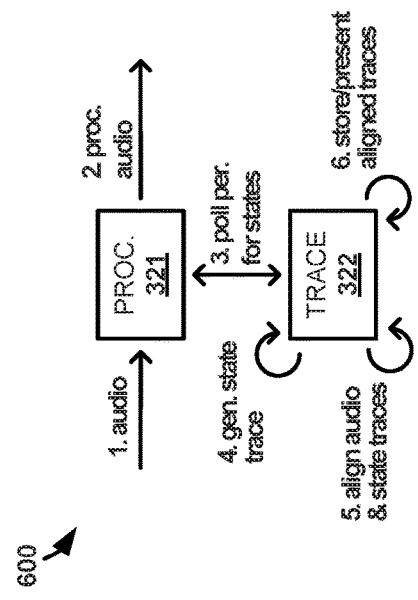
FIG. 6 illustrates yet another scenario of operating in the other audio processing environment to synchronize algorithmic state data with audio trace signals.

FIG. 6 illustrates scenario 600 to synchronize algorithmic state data with audio trace signals. Unlike in scenario 500, in scenario 600, digital audio processing algorithm 321 comprises an algorithm that does not have the built-in capability of performing digital state data recordings and/or audio trace recordings. However, digital audio processing algorithm 321 in this example does provide external read access capability to its digital algorithmic state data so that it can be read by audio trace module 322.

Specifically, like in scenario 500, scenario 600 provides that digital audio processing algorithm 321 is applied to the digital audio from user system 302 at step 1. If digital audio processing algorithm 321 produces an output of processed audio, that processed audio is output at step 2. If the purpose of digital audio processing algorithm 321 is to produce certain state or trigger information, then digital audio processing algorithm 321 may not produce an audio output. While processing the digital audio, at step 3, audio trace module 322 runs in parallel with digital audio processing algorithm 321 and polls digital audio processing algorithm 321 in real-time to retrieve the digital algorithmic state data. Audio trace module 322 reads the digital state and trigger data at a pre-defined sampling rate which should be set to a rate great enough that no state/trigger change would go unnoticed when processing the digital audio.

At step 4, audio trace module 322 generates a trace of the digital algorithmic state data out of the polled information either as the digital algorithmic state data is collected or once all digital algorithmic state data is collected. Essentially, the trace generated at step 4 is the same type of trace that was generated by digital audio processing algorithm 321 itself in step 3 of scenario 500. In alternative examples, audio trace module 322 may maintain the digital algorithmic state data in a format containing real-time timestamps that can be further post-processed into viewable audio streams.

At step 4, the digital algorithmic state data is aligned with the digital audio. In this case, if step 3 was started in sync with digital audio processing algorithm 321's processing of the digital audio, then a time-synchronized relationship with the digital audio will already exist. However, if step 3 was not started in sync with digital audio processing algorithm 321's processing of the digital audio, during presentation at step 5, a one-time manual digital/audio data alignment can be performed by a user in a viewer/editor while maintaining end-to-end data sync integrity of the digital algorithmic state data. As aforementioned, at step 5, audio trace module 322 can store the resulting digital algorithmic state data in conference system 301, or in some other storage system, for later retrieval and presentation to a user. Alternatively, the user may be presented with the trace immediately. With the digital algorithmic state data captured in real-time relationship with the audio capture, both sets of data files can be opened and viewed using a standard audio viewer/editor.

It should be understood that more than one algorithm may be used to process the digital audio. Thus, while digital audio processing algorithm 321 may be of a type that requires one of scenarios 500 and 600 to generate a trace of the digital algorithmic state data, another algorithm processing the digital audio on conference system 301 may use the other scenario.

Referring back to scenario 400, the audio processed by conference system 301 is then transferred to user systems 303-304. Therefore, in accordance with the examples above, during or after the conference session, a user can view the digital algorithmic state data in time synchronization with a trace of the conference audio to determine whether digital audio processing algorithm 321 is operating as desired. If not, the user should be able to easily see where in the audio trace an undesirable instance of the digital algorithmic state data is occurring and adjust digital audio processing algorithm 321 to achieve the desired result.

Figure 7:
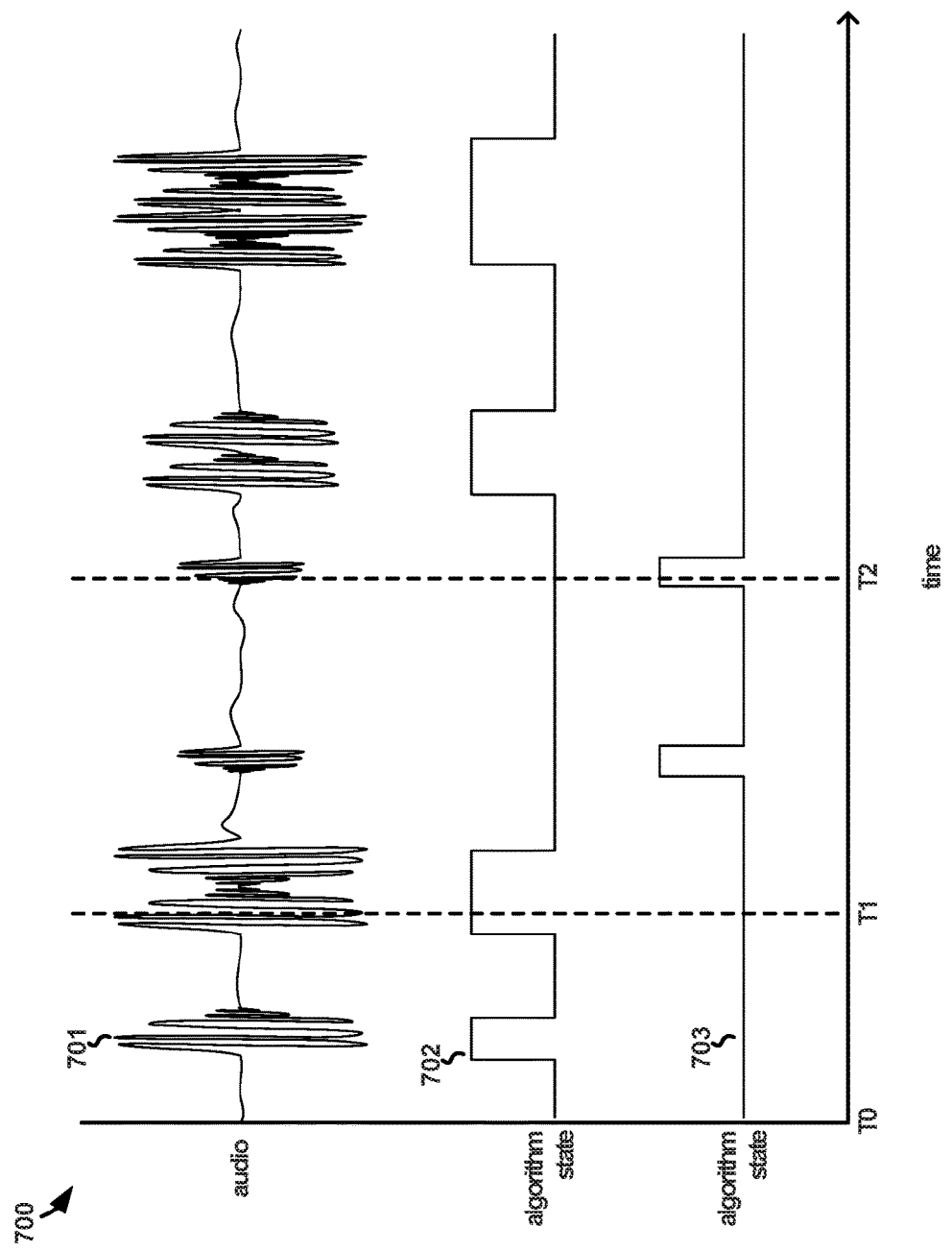
FIG. 7 illustrates a graphical representation of synchronized algorithmic state data with audio trace signals.

FIG. 7 illustrates graphical representation 700 of synchronized algorithmic state data with audio trace signals. Graphical representation 700 is an example of what may be presented to a user after scenarios 500 and/or 600 are run. In particular, graphical representation 700 shows trace 701 of the digital audio that is processed, trace 702 of a portion of the generated digital algorithmic state data, and trace 703 of another portion of the generated digital algorithmic state data. In some examples, traces 702 and 703 may correspond to different processing blocks of digital audio processing algorithm 321 while, in other examples, trace 702 may be generated from digital algorithmic state data of digital audio processing algorithm 321 and trace 703 may be generated from another algorithm used to process the digital audio.

Traces 702 and 703 are aligned in time synchronization with trace 701 and all start at time T0. As time progresses, the digital algorithmic state data represented by traces 702 and 703 changes. For example, when either of traces 702 and 703 goes up, that may indicate that a condition was triggered when processing the digital audio. Specifically, since traces 701-703 are time synchronized, any time along the time axis will correspond to the same time on each of traces 701-703. For instance, at time T1, trace 702 displays a triggered state while trace 703 displays a non-triggered state and a user can easily see what characteristics of trace 701 existed at time T1 to cause those states. Likewise, at time T2, trace 702 displays a non-triggered state while trace 703 displays a triggered state and a user can easily see what characteristics of trace 701 existed at time T2 to cause those states.

In a more specific example, trace 702 may represent the states of an algorithm that detects whether there is speech in digital audio. Also, trace 703 may represent the states of an algorithm that detects noise that should be removed from the digital audio. A user can easily see which portions of the trace 701 correspond to the triggered states of traces 702 and 703. Thus, if the speech or noise detection algorithms triggered at the wrong time or did not trigger correctly, then a user can see that there is an issue and adjust the algorithm to fix the issue.

Figure 8:
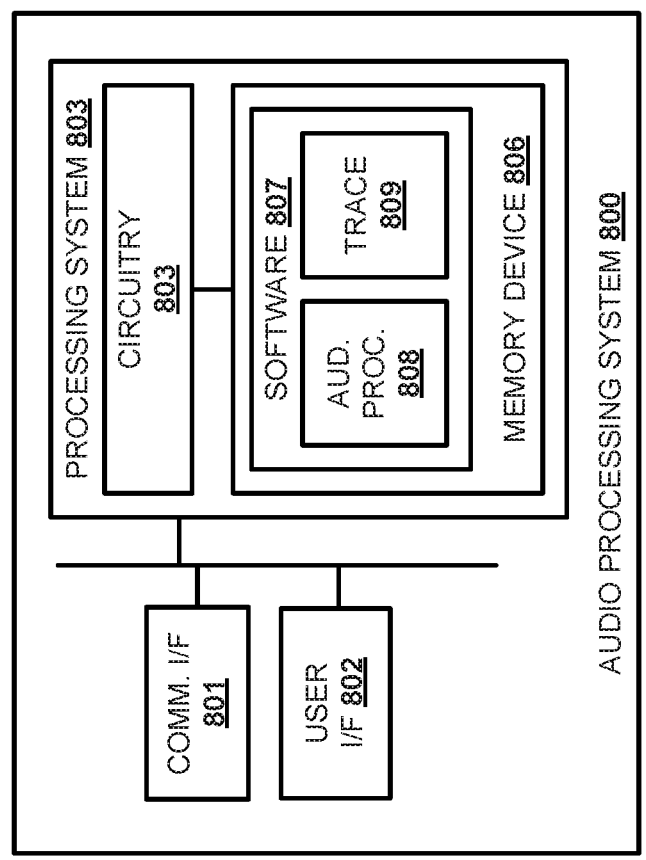
FIG. 8 illustrates a computing architecture for implementing an audio processing system to synchronize algorithmic state data with audio trace signals.

FIG. 8 illustrates a computing architecture for audio processing system 800. Audio processing system 800 is an example of audio processing system 101, although audio processing system 101 may use alternative configurations. Audio processing system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. Communication interface 801 may be omitted in some examples.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes audio processing module 808 and trace module 809. Operating software 807 may further include an operating system, utilities, drivers, network interfaces, applications, or some other type of software. When executed by circuitry 805, operating software 807 directs processing system 803 to operate audio processing system 800 as described herein.

In particular, audio processing module 808 directs processing system 803 to process digital audio data linearly in the time domain using a digital audio processing algorithm. Trace module 809 directs processing system 803 to determine the digital algorithmic state data comprising an output state of the digital audio processing algorithm at each of a plurality of time instances during the processing of the digital audio data. Also, trace module 809 directs processing system 803 to align the digital algorithmic state data in the time domain with a trace of the digital audio data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for providing audio trace signals synchronized with digital algorithmic state data, the method comprising:
   processing digital audio data linearly in the time domain using a digital audio processing algorithm;
   determining the digital algorithmic state data comprising an output state of the digital audio processing algorithm at each of a plurality of time instances during the processing of the digital audio data; and
   aligning the digital algorithmic state data in the time domain with a trace of an audio signal represented by the digital audio data.

2. The method of claim 1, further comprising:
   displaying a graph of the algorithmic state data aligned in the time domain with the trace of the audio signal represented by the digital audio data.

3. The method of claim 1, wherein determining the digital algorithmic state data comprises:
   using the digital audio processing algorithm to generate a first digital audio trace populated with the algorithm state outputs in the time domain based on corresponding time instances of the plurality of time instances.

4. The method of claim 3, wherein aligning the digital algorithmic state data in the time domain with the trace of the audio signal represented by the digital audio data comprises:
   aligning the trace of the audio signal represented by the digital audio data with the first digital audio trace in the time domain.

5. The method of claim 1, wherein determining the digital algorithmic state data comprises:
   polling the output of the digital audio processing algorithm at the plurality of time instances to identify the output states; and
   storing the output states in association with respective ones of the plurality of time instances.

6. The method of claim 5, wherein aligning the digital algorithmic state data in the time domain with the trace of the audio signal represented by the digital audio data comprises:
   generating a first digital audio trace populated with the output states at the respective ones of the plurality of time instances; and
   aligning the trace of the audio signal represented by the digital audio data with the first digital audio trace in the time domain.

7. The method of claim 6, wherein aligning the trace of the audio signal represented by the digital audio data with the first digital audio trace in the time domain comprises:
   receiving user input indicating proper alignment of the trace of the audio signal represented by the digital audio data with the first digital audio trace in the time domain.

8. The method of claim 1, wherein aligning the trace of the audio signal represented by the digital audio data with the first digital audio trace in the time domain comprises:
   automatically synchronizing timing of the trace of the audio signal represented by the digital audio data with the timing of the first digital audio trace based on the plurality of time instances.

9. The method of claim 1, further comprising:
   storing the digital algorithmic state data in a digital audio format.

10. The method of claim 9, wherein the digital audio format comprises pulse-code modulation.

11. An audio processing system for providing audio trace signals synchronized with digital algorithmic state data, the audio processing system comprising:
    one or more computer readable storage media;
    a processing system operatively coupled with the one or more computer readable storage media; and
    program instructions stored on the one or more computer readable storage media that, when read and executed by the processing system, direct the processing system to:
    process digital audio data linearly in the time domain using a digital audio processing algorithm;
    determine the digital algorithmic state data comprising an output state of the digital audio processing algorithm at each of a plurality of time instances during the processing of the digital audio data; and
    align the digital algorithmic state data in the time domain with a trace of an audio signal represented by the digital audio data.

12. The audio processing system of claim 11, wherein the program instructions further direct the processing system to:
    direct a display to display a graph of the algorithmic state data aligned in the time domain with the trace of the audio signal represented by the digital audio data.

13. The audio processing system of claim 11, wherein to determine the digital algorithmic state data, the program instructions direct the processing system to at least:
    use the digital audio processing algorithm to generate a first digital audio trace populated with the algorithm state outputs in the time domain based on corresponding time instances of the plurality of time instances.

14. The audio processing system of claim 13, wherein to align the digital algorithmic state data in the time domain with the trace of the audio signal represented by the digital audio data, the program instructions direct the processing system to at least:
    align the trace of the audio signal represented by the digital audio data with the first digital audio trace in the time domain.

15. The audio processing system of claim 11, wherein to determine the digital algorithmic state data, the program instructions direct the processing system to at least:
- poll the output of the digital audio processing algorithm at the plurality of time instances to identify the output states; and
- store the output states in association with respective ones of the plurality of time instances.

16. The audio processing system of claim 15, wherein to align the digital algorithmic state data in the time domain with the trace of the audio signal represented by the digital audio data, the program instructions direct the processing system to at least:
- generate a first digital audio trace populated with the output states at the respective ones of the plurality of time instances; and
- align the trace of the audio signal represented by the digital audio data with the first digital audio trace in the time domain.

17. The audio processing system of claim 16, wherein to align the trace of the audio signal represented by the digital audio data with the first digital audio trace in the time domain, the program instructions direct the processing system to at least:
- receive user input indicating proper alignment of the trace of the audio signal represented by the digital audio data with the first digital audio trace in the time domain.

18. The audio processing system of claim 11, wherein to align the trace of the audio signal represented by the digital audio data with the first digital audio trace in the time domain, the program instructions direct the processing system to at least:
- automatically synchronize timing of the trace of the audio signal represented by the digital audio data with the timing of the first digital audio trace based on the plurality of time instances.

19. The audio processing system of claim 11, wherein the program instructions further direct the processing system to:
- store the digital algorithmic state data in a digital audio format.

20. The audio processing system of claim 19, wherein the digital audio format comprises pulse-code modulation.

* * * * *